United States Patent [19]

Hsia et al.

[11] Patent Number: 5,730,610
[45] Date of Patent: Mar. 24, 1998

[54] MEMORY CARD CONNECTOR HAVING A SPRING RESTRAINED ACTIVATOR ROD AND FOLDING PUSH BUTTON MECHANISM

[75] Inventors: Chih-Hui Hsia, Neihu Taipei; Lein Wan Lu, Yang-Mei Tao-Yuan Hsien, both of Taiwan

[73] Assignee: Berg Technology, Inc., Reno, Nev.

[21] Appl. No.: 620,453

[22] Filed: Mar. 22, 1996

[51] Int. Cl.⁶ ................................................ H01R 13/62
[52] U.S. Cl. ........................... 439/160; 439/155; 439/157
[58] Field of Search ...................... 439/160, 152, 439/153, 155, 157, 159, 372, 817, 840, 841; 361/754, 798

[56] References Cited

U.S. PATENT DOCUMENTS

| | | | |
|---|---|---|---|
| 4,570,196 | 2/1986 | Shimaoka et al. | 360/97 |
| 4,570,289 | 2/1986 | Consolati | 16/228 |
| 5,161,989 | 11/1992 | Okubo et al. | 439/159 |
| 5,208,942 | 5/1993 | Simon | 16/115 |
| 5,299,089 | 3/1994 | Lwee | 361/684 |
| 5,324,204 | 6/1994 | Lwee | 439/64 |
| 5,383,789 | 1/1995 | Watanabe | 439/159 |
| 5,389,001 | 2/1995 | Broschard et al. | 439/159 |
| 5,421,737 | 6/1995 | Chen et al. | 439/157 |
| 5,443,395 | 8/1995 | Wang | 439/159 |
| 5,451,168 | 9/1995 | Shuey | 439/159 |
| 5,466,166 | 11/1995 | Law et al. | 439/159 |
| 5,470,241 | 11/1995 | Kaufman et al. | 439/159 |
| 5,473,505 | 12/1995 | Kessoku et al. | 361/684 |
| 5,492,480 | 2/1996 | Fusselman et al. | 439/157 |
| 5,507,658 | 4/1996 | Ho | 439/159 |
| 5,515,575 | 5/1996 | Pinazza | 16/228 |
| 5,558,527 | 9/1996 | Lin | 439/160 |

FOREIGN PATENT DOCUMENTS

| | | | |
|---|---|---|---|
| 0 532 346 A2 | 11/1992 | European Pat. Off. | H01R 23/68 |
| 0 686 936 A2 | 3/1995 | European Pat. Off. | G06K 13/633 |
| 0 687 035 A2 | 5/1996 | European Pat. Off. | H01R 13/633 |

*Primary Examiner*—P. Austin Bradley
*Assistant Examiner*—Tho D. Ta
*Attorney, Agent, or Firm*—Daniel J. Long; M. Richard Page

[57] ABSTRACT

A memory card connector in which an axial helical spring returns the actuator rod to its original forward position after the push button has been used to eject the memory card. The push button is also foldable to a transverse position when not in use.

8 Claims, 6 Drawing Sheets

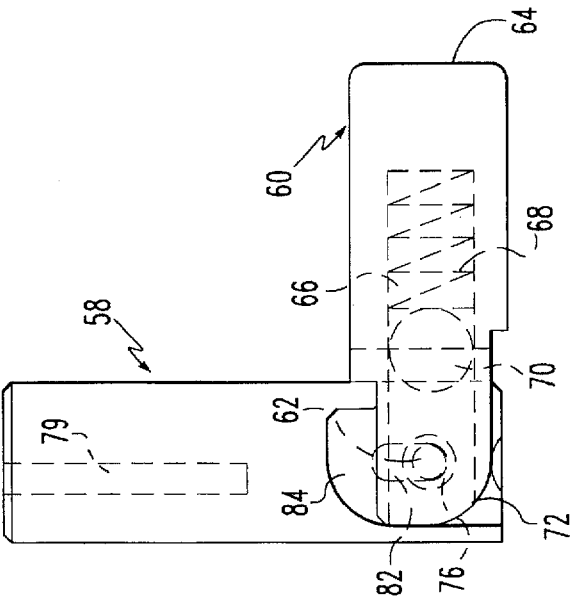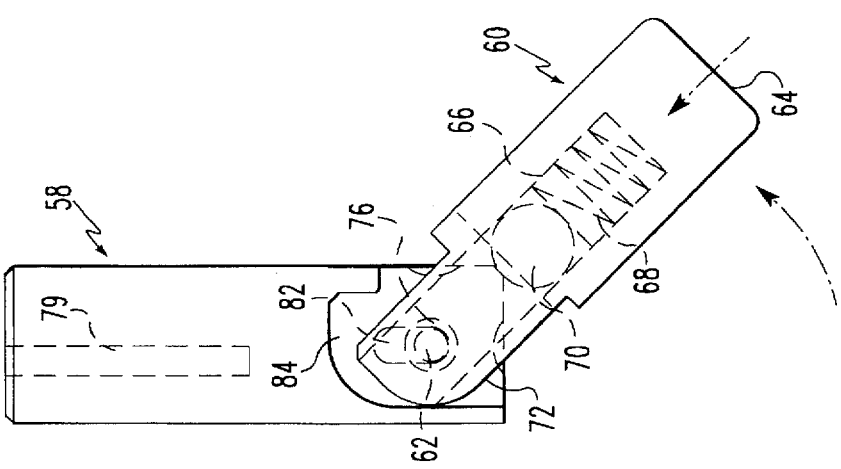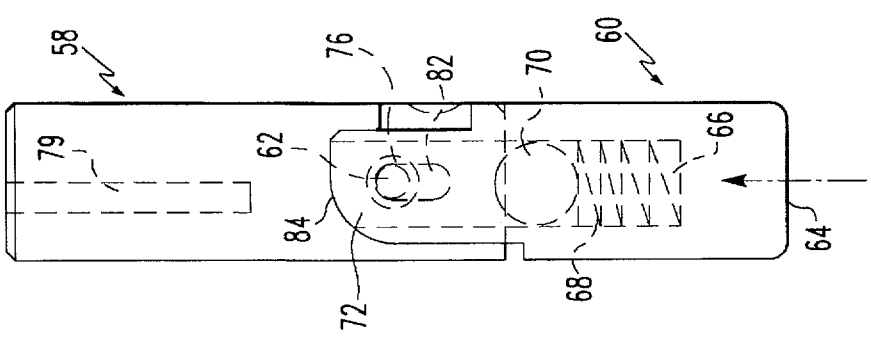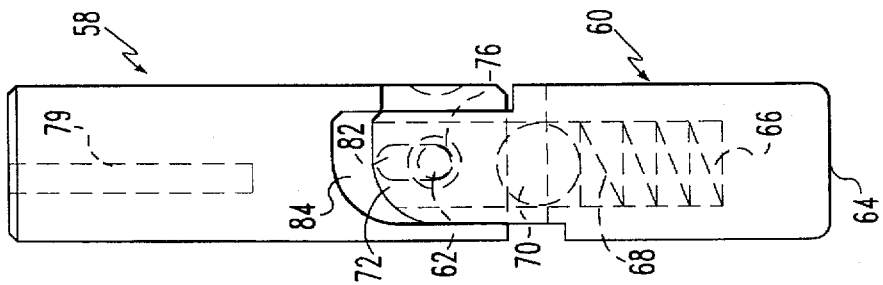

5,730,610

MEMORY CARD CONNECTOR HAVING A SPRING RESTRAINED ACTIVATOR ROD AND FOLDING PUSH BUTTON MECHANISM

BACKGROUND OF THE INVENTION

1. Field of the Invention

The present invention relates to electrical connectors and more particularly to electrical connectors for computer memory cards.

2. Brief Description of Prior Developments

Memory cards are conventionally connected to computers by means of connectors comprising a frame member which will have a transverse rear element and a pair of longitudinal elements having opposed card receiving grooves on their inner surfaces. A connector header is positioned adjacent the transverse rear element, and the memory card is inserted between the side elements of the frame and then engaged with the header. The connector also includes an eject mechanism which conventionally may be an eject plate which is positioned directly beneath the rear transverse element of the frame. An ejector actuator rod is positioned laterally adjacent to one of the longitudinal elements of the frame and extends rearwardly to be connected by a pin to one end of an eject arm. The eject arm is at its other end connected to the eject plate and is medially connected by a fulcrum pin to both the eject plate and the rear transverse section of the frame. When the user applies inward longitudinal pressure to the actuator rod at its front push button, the arm pivots on the fulcrum pin to move the ejector plate forward against the rear end of the memory card so as to move it out of engagement with the connector header. A disadvantage to such memory card ejection systems exists in that the push button will be displaced rearwardly along with the entire actuator rod when pressure is applied to it. When a memory card is inserted, the actuator rod will then be moved in a forward direction so that the push button returns to its original position. Since the position of the push button changes, the push button will either protrude outside the computer case or draw back inside the case. This arrangement is inconvenient for both the case designer and the user.

A need, therefore, exists for a memory card connector in which the push button remains at a convenient position not protruding from the case or being unduly recessed inside the case.

SUMMARY OF THE INVENTION

The memory card connector of the present invention comprises a frame having a rear transverse element and opposed longitudinal elements. The longitudinal elements extend forward from said rear transverse element and are spaced at an interval substantially equal to the width of the memory card. The opposing side elements define a storage space, and one end of said frame defines an insertion inlet for inserting the memory into the storage space. The opposed longitudinal elements are positioned in parallel planes and the memory cards positioned in a plane perpendicular to said longitudinal element planes. A header is positioned adjacent the rear transverse element of the frame opposite the insertion inlet. An eject plate is movably mounted on the frame and is operable to slide away from the header to eject the card-like electronic medium. A link arm is pivotally connected to the frame and has an eject plate engagement means for moving the eject plate away from the header to eject the memory card. An elongated activator means such as an elongated rod for pivoting said link arm is provided to move the eject plate and the memory card away from the header. The elongated activator means has a front first position and a rear second position. A rod manipulation means having a push button is also provided at the front terminal end of the activator means. When axial force is applied to the push button, the elongated activator means is displaced from its first front position to its second rear position to pivot the link arm. Means are provided to then return the elongated activator means back to its first forward position after it has been displaced to its second rearward position to pivot the link arm. The means for returning the activator means to its first forward position may, for example, be an axial helical spring. The rod manipulation means may also be folded to a transverse position.

The term "memory card" as used herein includes any type I, type II or type III PCMCIA card as well as any other card which may be used in any type of computer system to perform a similar function.

BRIEF DESCRIPTION OF THE DRAWINGS

The invention is further described with reference to the accompanying drawings in which:

FIGS. 6a–6d are schematic side views of the rod manipulation push button shown in FIG. 5 illustrating successive steps in its operation.

DETAILED DESCRIPTION OF THE PREFERRED EMBODIMENTS

Figure 1:
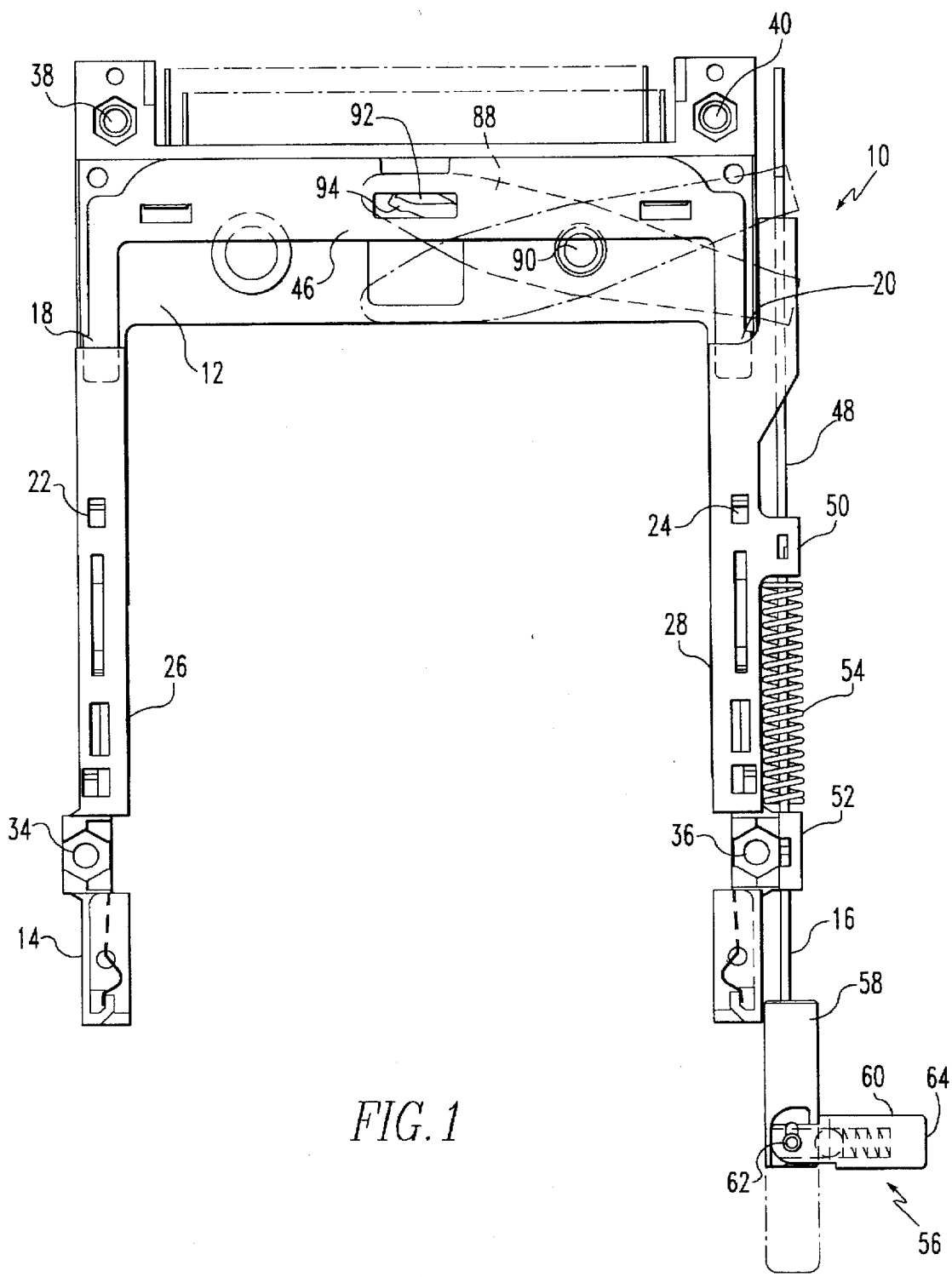
FIG. 1 is a plan view of a memory card connector representing a preferred embodiment of the present invention.
Figure 2:
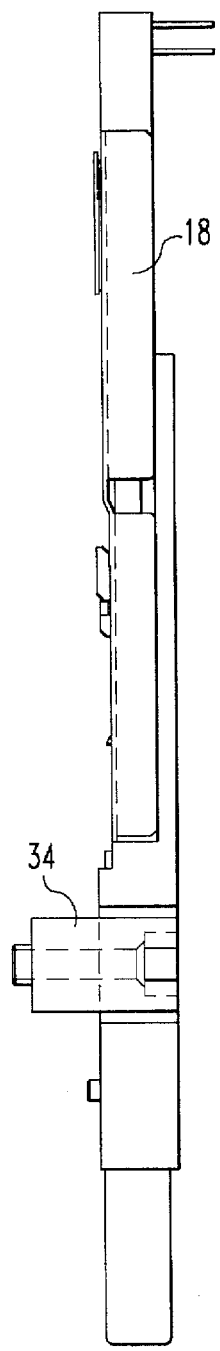
FIG. 2 is a side elevational view of the memory card connector shown in FIG. 1.
Figure 3:
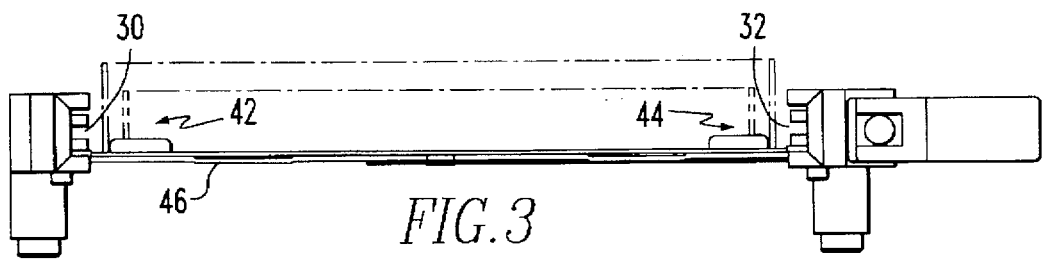
FIG. 3 is an end view of the memory card connector shown in FIG. 1.

Referring to FIGS. 1–3, the memory card and connector assembly of the present invention includes a frame member shown generally at numeral 10. This frame member is made up of a metallic rear transverse element 12 and two plastic longitudinal elements 14 and 16. The rear transverse element has metal extensions 18 and 20 which extend perpendicularly therefrom to be connected to the longitudinal elements by means of clips respectively at 22 and 24. On the longitudinal elements 14 and 16 there are also ESD contacts respectively at 26 and 28 and EMI contacts respectively at 30 and 32. There are also front apertures respectively at 34 and 36 through these two longitudinal elements which with rear apertures 38 and 40 in the header as is explained below will be used to connect the assembly to a printed wiring board. There are also side grooves 42 and 44 in the two longitudinal elements which serve to retain the memory card between those elements. It will also be seen that them is also a card engagement plate 46 immediately beneath the rear transverse element of the frame. An activator rod 48 is held in parallel adjacent relation to one of the longitudinal members of the frame bilateral supports 50 and 52. The activator rod is movable through the lateral supports to move a pivot arm. Between the lateral supports there is an axial helical spring 54 surrounding the activator rod. At the forward terminal end of the activator rod there is a rod manipulation mechanism shown generally at numeral 56. This mechanism includes a proximate cap 58 which is attached directly to the rod and extends radially therefrom. The mechanism also includes a distal cap 60 which is pivotally attached to the proximate cap by a dowel pin 62. At its outer terminal end the distal cap has a push button surface 64.

Figure 4A:
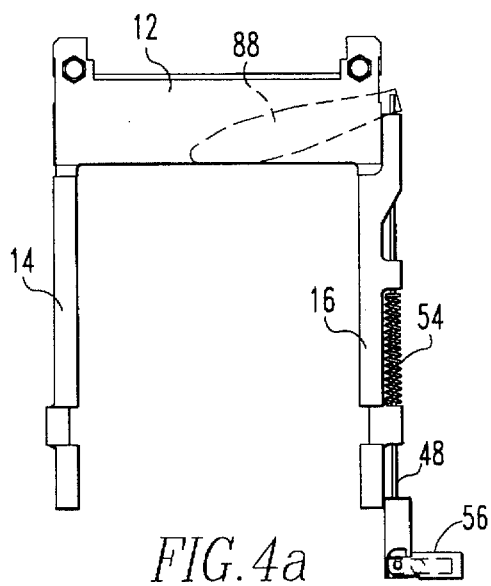
FIGS. 4a–4f are schematic plan views of the memory card connector shown in FIG. 1 illustrating successive steps in its operation.
Figure 4B:
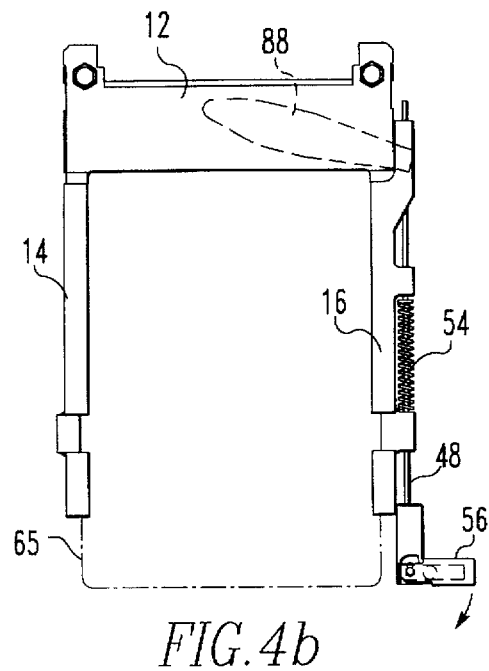
Figure 4C:
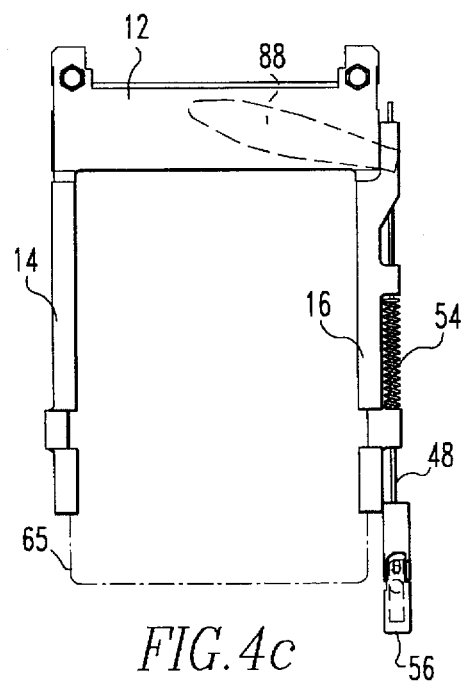
Figure 4D:
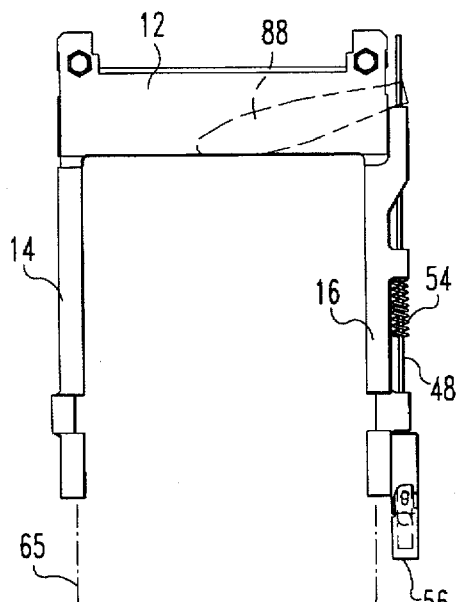
Figure 4E:
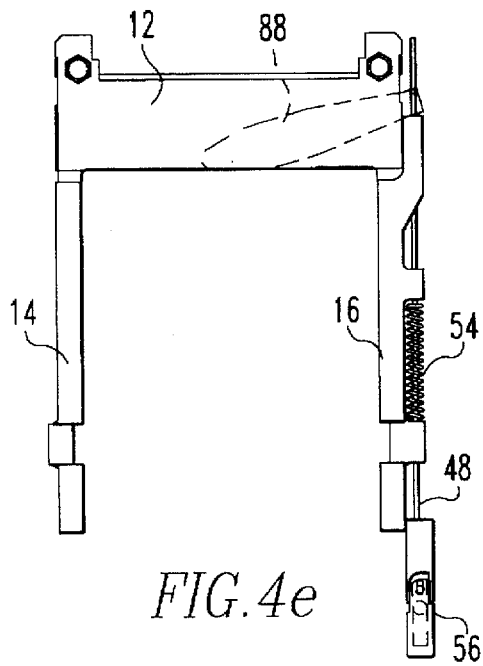
Figure 4F:
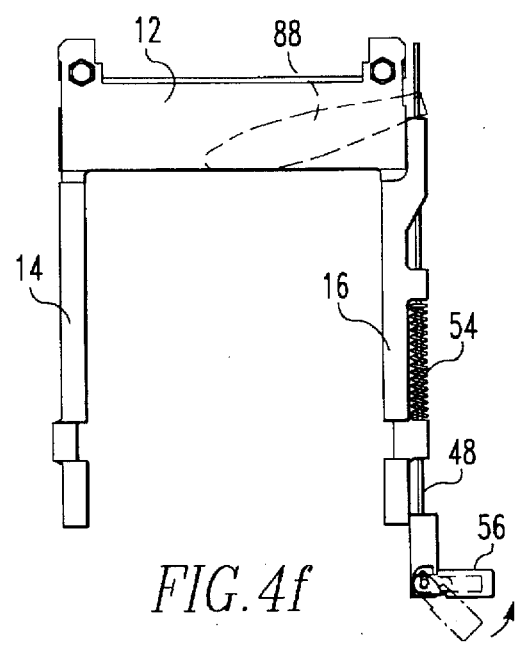

Referring to FIGS. 4a–4f the operation of the memory card connector described above is illustrated in further detail. In FIG. 4a the memory card connector is shown without the memory card inserted and with the pivot arm being in a rearward position. Even though the pivot arm is at this rearward position, the activator rod is at its first forward position being restrained by action of the axial helical spring. In FIG. 4b a memory card 65 is inserted to pivot the pivot arm to a forward position and apply axial force on the activator rod in a forward direction. It will be noted that the rod manipulation mechanism is pivoted in FIGS. 4a and 4b to its transverse position; however, when it is desired to use the push button the distal cap is pivoted to its longitudinal position as is shown in FIG. 4c. It will also be appreciated by those skilled in the art that the elongated aperture would allow a limited amount of unintentionally applied axial force to be applied to the actuator rod without causing the card to be ejected. When the push button is exposed, axial pressure may be applied to the activator rod in a manner shown as in FIG. 4d to displace the rod longitudinally to its second rearward position. Such displacement of the activator rod will pivot the pivot arm and move the eject plate to eject the memory card. After the memory card has been ejected and pressure is released from the push button the axial spring will return the activator to its forward first position as is shown in FIG. 4e. Subsequently the rod manipulation mechanism will be pivoted to its transverse position as is shown in FIG. 4f. It will also be appreciated by those skilled in the art that the rod manipulation mechanism may also be pivoted to its transverse position after the completion of the step shown in FIG. 4c. As stated above, the elongated aperture might help prevent the unintentional ejection of the card resulting from any excessive axial force which might be applied in this pivoting motion. Ordinarily the rod manipulation mechanism will remain in this transverse position until it is again desired to eject the memory card.

Figure 5:
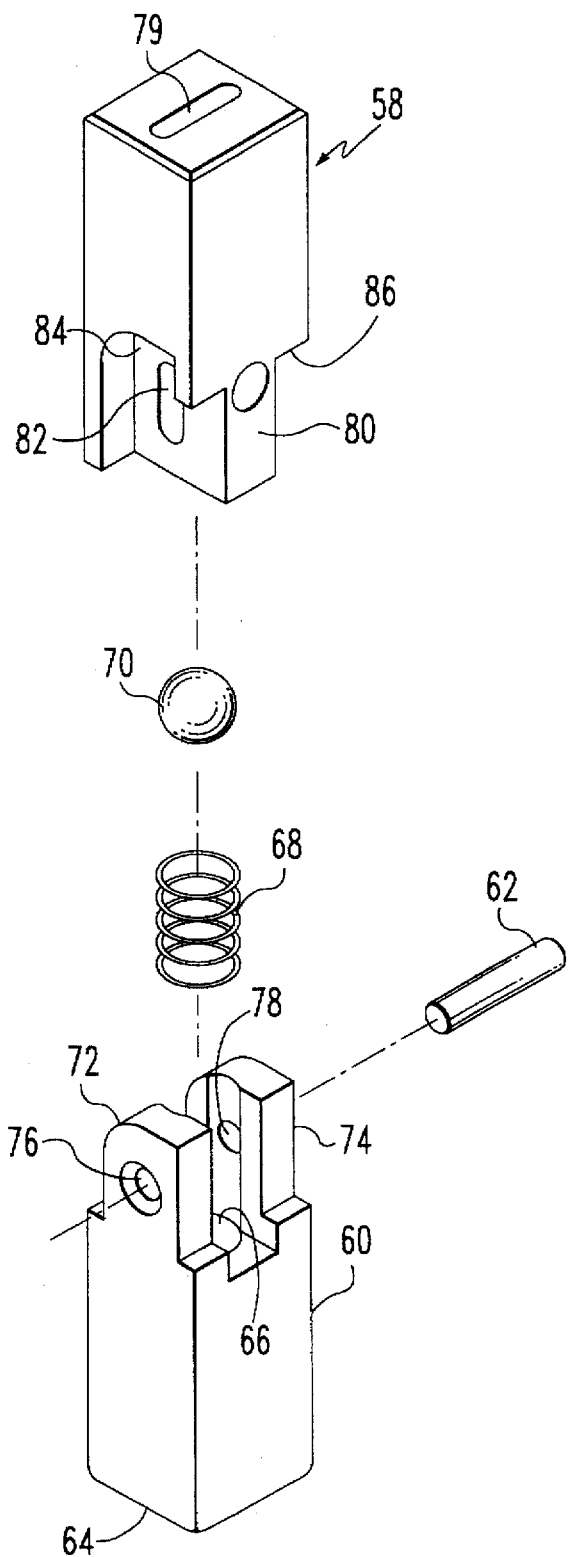
FIG. 5 is an exploded perspective view of the rod manipulation push button used in the memory card connector shown in FIG. 1.

Referring to FIG. 5, the rod manipulation mechanism is shown in greater detail in which the proximate cap is shown generally at numeral 58 and the distal cap at numeral 60 and the dowel pin connecting the two caps at numeral 62. On the distal cap there is a push button surface 64. There is an axial bore 66 in the distal cap in which there is emplaced an axial helical spring 68, and a steel ball 70 is superimposed over the axial helical spring. The distal cap has lateral longitudinal projections 72 and 74 which have respectively aligned transverse apertures 76 and 78. The proximate cap has an axial bore 79 where it engages the actuator rod and a central longitudinal projection 80 which itself has a transverse aperture 82. After the spring and steel ball are emplaced in the axial bore of the distal cap, the proximate cap is engageable with the proximate cap by emplacing the central longitudinal projection of the distal cap between the lateral longitudinal projections of the proximate cap so that the transverse apertures of all three projections are aligned thereafter fitting the dowel pin through these apertures. It will be noted that the transverse aperture 82 in the proximate cap is longitudinally elongated to allow the distal cap to be movable longitudinally on the dowel pin. There are also lateral recesses 84 and 86 on the proximate cap which accommodate the lateral projections on the distal cap.

Referring to FIGS. 6a–6d, the operation of the rod manipulation mechanism is illustrated in further detail. In FIG. 6a the mechanism is in its longitudinal position with the axial helical spring in the distal cap applying pressure against the steel ball which bears against the central longitudinal projection of the proximate cap to restrain that distal cap from pivoting relative to the proximate cap on the dowel pin. In FIG. 6b force is applied to the push button surface 64 of the distal cap so that the central longitudinal projection of the proximate cap presses against the steel ball and compresses the axial spring in the distal cap and allows the dowel pin to move relative to the distal cap in the elongated aperture in the central longitudinal projection. It will also be seen that the lateral projections on the distal cap move further into the recesses of the proximate cap. In FIG. 6b pivoting motion is applied to the distal cap to displace it to the transverse position shown in FIG. 6d where external force is removed from the push button to allow the axial spring in the distal cap to force the steel ball against the proximate cap.

Referring particularly again to FIGS. 1–3, at its rearward end the activator bar is connected to the pivot arm 88. This arm 88 is connected by means of fulcrum pin 90 to the rear transverse element of the frame member and the card engagement plate positioned immediately beneath that rear transverse element. It will also be seen that at its opposite end the arm has an oblong aperture 92 through which cam projection 94 extends. As is conventional, this oblong aperture and cam projection interact so that when pressure is applied rearwardly to the front pressure surface of the activator bar the arm will pivot on the fulcrum pin and move the card engagement plate forward to displace the card from the connector header.

It will be appreciated that a memory card connector has been described in which the push button for ejection of the memory card remains at a consistent convenient position in which it neither protrudes from the computer case nor is unduly recessed from it. It will also be appreciated that a convenient means is provided to pivot the push button out of the way when it is not in use.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A connector apparatus for an electronic card medium having a width, said connector apparatus comprising:

(a) a frame member having a rear transverse element and a pair of opposed longitudinal elements extending forward from said rear transverse element and spaced at an interval substantially equal to the width of said electronic card medium, said opposed longitudinal elements defining a storage space, one end of said frame defining an insertion inlet for inserting the electronic card medium into the storage space;

(b) a header positioned adjacent the rear transverse element of the frame opposite the insertion inlet;

(c) an eject plate movably mounted on the frame and operable to slide away from the header to eject the electronic card medium;

(d) a link arm pivotally connected to the frame and having an eject plate engagement means for moving the eject plate away from the header to eject the electronic card medium;

(e) an elongated activator means connected to the link arm and being movable from a forward first position to a rearward second position to pivot said link arm to move the eject plate away from the header and eject the electronic card medium; and means for returning the elongated activator means to its forward first position after said elongated activator means has been moved from said forward first position to said rearward second position to pivot the link arm, wherein the elongated activator means is a rod disposed in generally parallel adjacent relation to one of the opposed side elements of the frame and said rod has a front end and a rear end and said rear end is fixed to the said link arm and at said front end there is a rod manipulation means where rearwardly directed axial longitudinal force may be applied on the rod and the rearward application of force on the rod manipulation means causes the rod to move rearwardly to pivot the link arm and eject the electronic card medium while the insertion of an electronic card medium into the storage space of the frame causes the link arm to pivot to apply a forwardly directed axial longitudinal force on the rod and the rod manipulation means is pivotally fixed to the rod to be angularly displaceable between a transverse position and an axial longitudinal position and the rod manipulation means is comprised of a distal cap and a proximate cap which extends radially from the rod and the remote cap is pivotally fixed to the proximate cap and there are axial spring means for providing tension to restrain said rod manipulation means from being displaced from either its transverse position or its longitudinal position and wherein there is an axial bore in one of said proximate or distal caps and the spring means is positioned in said axial bore and a metallic ball member is superimposed over the spring means in said axial bore one of the proximate or distal caps has an axial recess and the other of the proximate or distal caps has an axial projection and said axial projection bears against the metallic ball member and there are aligned transverse apertures in the proximate and distal caps, one of said apertures passing through said axial projections, in which at least one of the transverse apertures in one of the proximate or distal caps is axially elongated and transverse connecting means extend through the transverse apertures in the proximate and distal caps, whereby said elongated transverse aperture allows the distal cap to be movable axially on the transverse connecting means such that said proximate and distal caps are pivotable relative to each other on said metallic ball member and said elongated transverse aperture would accommodate the application of a limited amount of axial force on the rod without causing the electronic card medium to be ejected.

2. The connector apparatus of claim 1 wherein the rod manipulation means has a terminal push button surface.

3. The connector apparatus of claim 1 wherein the rod manipulation means is in its axial longitudinal position when the force is applied to the push button surface.

4. The connector apparatus of claim 1 wherein the rod manipulation means is in its transverse position when the push button surface is not in use.

5. The connector apparatus of claim 1 wherein means for returning the elongated activator means to its forward first position is an axial spring.

6. The connector apparatus of claim 1 wherein proximate and distal caps pivot relative to each other on said metallic ball member.

7. The connector apparatus of claim 6 wherein there are aligned transverse apertures in the proximate and distal caps.

8. The connector apparatus of claim 7 wherein the transverse aperture in one of the proximate or distal caps is axially elongated.

* * * * *